US012604108B2

(12) United States Patent (10) Patent No.: US 12,604,108 B2
Joo et al. (45) Date of Patent: Apr. 14, 2026

(54) LIGHTFIELD CAMERA THAT CAN SIMULTANEOUSLY ACQUIRE 2D INFORMATION AND 3D SPATIAL INFORMATION FROM SAME DEPTH

(71) Applicant: Korea Photonics Technology Institute, Gwangju (KR)

(72) Inventors: Kyung Il Joo, Naju-si (KR); Min Kyu Park, Seoul (KR); Sung Jin Lim, Daegu (KR); Tae Hyun Lee, Gwangju (KR); Ki Dong Lim, Gwangju (KR)

(73) Assignee: Korea Photonics Technology Institute, Gwangju (KR)

( * ) Notice: Subject to any disclaimer, the term of this patent is extended or adjusted under 35 U.S.C. 154(b) by 53 days.

(21) Appl. No.: 18/950,417

(22) Filed: Nov. 18, 2024

(65) Prior Publication Data

US 2025/0193537 A1      Jun. 12, 2025

(30) Foreign Application Priority Data

Dec. 7, 2023    (KR) ........................ 10-2023-0176746

(51) Int. Cl.
*H04N 23/957* (2023.01)
*G02B 27/28* (2006.01)
*H04N 23/55* (2023.01)

(52) U.S. Cl.
CPC ......... *H04N 23/957* (2023.01); *G02B 27/285* (2013.01); *H04N 23/55* (2023.01)

(58) Field of Classification Search
None
See application file for complete search history.

(56) References Cited

U.S. PATENT DOCUMENTS

| | | | | |
|---|---|---|---|---|
| 10,488,700 | B2 * | 11/2019 | Jung | ......................... G02F 1/13 |
| 11,199,735 | B2 * | 12/2021 | Zhou | ................... G02F 1/13306 |
| 11,985,431 | B2 * | 5/2024 | Skorka | .................. H04N 23/73 |
| 2015/0278569 | A1 * | 10/2015 | Zolotov | ............ G06K 7/10732 |
| | | | | 235/455 |
| 2020/0154042 | A1 | 5/2020 | Kim | |
| 2020/0370886 | A1 * | 11/2020 | Chen | ...................... G03B 13/20 |
| 2022/0082673 | A1 * | 3/2022 | Jin | ......................... H10F 39/806 |
| 2025/0008079 | A1 * | 1/2025 | Moon | ................ G02B 27/0025 |

OTHER PUBLICATIONS

Tae-Hyun Lee et al., Spatial-Resolution-Improved Light-Field Imaging System Using Virtual-Moving Microlens Array without Decrease of Angular Resolution, SID 2019 Digest.

* cited by examiner

*Primary Examiner* — Cynthia Calderon
(74) *Attorney, Agent, or Firm* — Dinsmore & Shohl LLP

(57) ABSTRACT

Disclosed is a lightfield camera that can simultaneously acquire two-dimensional information and three-dimensional spatial information from the same depth. An optical system includes a polarizer configured to adjust a polarization state of object light scattered from an object to one polarization direction, a polarization switching layer disposed at a rear end of the polarizer, and configured to adjust a polarization state of the object light having passed through the polarizer, a main lens configured to receive the light having passed through the polarization switching layer and focus the light to one focal point, a polarization-dependent concave lens disposed at a rear end of the main lens, and configured to transmit or disperse light depending on a polarization direction of the light, and a polarization micro lens array disposed at a rear end of the polarization-dependent concave lens, and configured to focus or transmit light.

13 Claims, 10 Drawing Sheets

100

<u>240</u>

LIGHTFIELD CAMERA THAT CAN SIMULTANEOUSLY ACQUIRE 2D INFORMATION AND 3D SPATIAL INFORMATION FROM SAME DEPTH

This research was financially supported by the Institute of Civil Military Technology Cooperation funded by the Defense Acquisition Program Administration and Ministry of Trade, Industry and Energy of Korean government under grant No. UM22203RD2

CROSS-REFERENCE TO RELATED APPLICATION

The present application claims priority under 35 U.S.C. § 119(a) to Korean Patent Application No. 10-2023-0176746, filed in the Korean Intellectual Property Office on Dec. 7, 2023, the entire disclosure of which is incorporated herein by reference.

BACKGROUND

1. Technical Field

The present disclosure relates to a lightfield camera that can simultaneously acquire two-dimensional information and three-dimensional spatial information from the same depth.

2. Related Art

Contents described in this part merely provide background information of an embodiment of the present disclosure, and do not constitute a conventional technology.

FIGS. 10A and 10B are diagrams illustrating the operation and shooting results of a general camera that acquires two-dimensional information.

As illustrated in FIG. 10A, a general camera (hereinafter, abbreviated as a 'two-dimensional camera') that acquires two-dimensional information focuses object light scattered from an object 1030 onto an image sensor 1020 by using a main lens 1010. Since the two-dimensional camera records amplitude information on each point of the object 1030 in each pixel within the image sensor 1020, the two-dimensional camera can acquire only the two-dimensional information, but can have a high resolution. That is, as illustrated in FIG. 10B, the two-dimensional camera can acquire a relatively very excellent image, but can acquire only an unfocused two-dimensional image for parts other than a focused area at the time of shooting.

A camera provided to solve such problems is a lightfield camera. The lightfield camera operates as illustrated in FIGS. 11A and 11B.

FIGS. 11A and 11B are diagrams illustrating the operation and shooting results of a general camera that acquires three-dimensional spatial information.

As illustrated in FIG. 11A, a general camera (hereinafter, abbreviated as a 'three-dimensional camera') that acquires three-dimensional spatial information does not directly focus object light scattered from an object 1030 onto an image sensor 1020 by using a main lens 1010, but primarily focuses the object light onto a micro lens array (MLA) 1110. The focused light enters the image sensor 1020 via the micro lens array 1110. In such a case, since the amplitude and direction information on each point of the object 1030 is recorded on a plurality of pixels, the three-dimensional camera can secure three-dimensional spatial information.

That is, as illustrated in FIG. 11B, the three-dimensional camera can obtain three-dimensional spatial information on an object, but acquires an image with a reduced resolution because the plurality of pixels record one point of the object 1030.

In this way, since the general two-dimensional camera and three-dimensional camera have different structures and operation principles, there is a problem in that the two cameras need to be provided in order to acquire both two-dimensional information and three-dimensional spatial information.

SUMMARY

Embodiments of the present disclosure are directed to providing a lightfield camera that can simultaneously acquire two-dimensional information and three-dimensional spatial information having the same depth.

According to an aspect of the present disclosure, an optical system includes: a polarizer configured to adjust a polarization state of object light scattered from an object to one polarization direction; a polarization switching layer disposed at a rear end of the polarizer based on a direction of travel of the object light, and configured to adjust a polarization state of the object light having passed through the polarizer; a main lens configured to receive the light having passed through the polarization switching layer and focus the light to one focal point; a polarization-dependent concave lens disposed at a rear end of the main lens based on the direction of travel of the object light, and configured to transmit or disperse light incident on the polarization-dependent concave lens depending on a polarization direction of the light; and a polarization micro lens array disposed at a rear end of the polarization-dependent concave lens based on the direction of travel of the object light, and configured to focus or transmit light incident on the polarization micro lens array depending on a polarization direction of the light.

According to an aspect of the present disclosure, when light having one-axis polarization direction is incident, the polarization-dependent concave lens transmits the incident light as is without changing a path.

According to an aspect of the present disclosure, when light having another-axis polarization direction is incident, the polarization-dependent concave lens disperses the light incident on the polarization-dependent concave lens.

According to an aspect of the present disclosure, when light having one-axis polarization direction is incident, the polarization micro lens array focuses the light incident on the polarization micro lens array.

According to an aspect of the present disclosure, when light having another-axis polarization direction is incident, the polarization micro lens array transmits the light incident on the polarization micro lens array as is.

According to an aspect of the present disclosure, the polarization switching layer adjusts a polarization direction of the light passing therethrough to one axis perpendicular to a direction of travel of the light or another-axis polarization direction.

According to an aspect of the present disclosure, a lightfield camera includes: the optical system; an image sensor configured to sense light having passed through the optical system; and a control unit configured to control the optical system to acquire two-dimensional information and three-dimensional spatial information from an object.

According to an aspect of the present disclosure, an optical system includes: a polarizer configured to adjust a polarization state of object light scattered from an object to one polarization direction; a polarization switching layer disposed at a rear end of the polarizer based on a direction of travel of the object light, and configured to adjust a polarization state of the object light having passed through the polarizer; a polarization-dependent concave lens disposed at a rear end of the polarization switching layer based on the direction of travel of the object light, and configured to transmit or disperse light incident on the polarization-dependent concave lens depending on a polarization direction of the light; a main lens configured to receive the light having passed through the polarization-dependent concave lens and focus the light to one focal point; and a polarization micro lens array disposed at a rear end of the polarization-dependent concave lens based on the direction of travel of the object light, and configured to focus or transmit light incident on the polarization micro lens array depending on a polarization direction of the light.

According to an aspect of the present disclosure, when light having one-axis polarization direction is incident, the polarization-dependent concave lens transmits the incident light as is without changing a path.

According to an aspect of the present disclosure, when light having another-axis polarization direction is incident, the polarization-dependent concave lens disperses the light incident on the polarization-dependent concave lens.

According to an aspect of the present disclosure, when dispersing the light incident on the polarization-dependent concave lens, the polarization-dependent concave lens has a preset refractive power and disperses the light.

According to an aspect of the present disclosure, when light having one-axis polarization direction is incident, the polarization micro lens array focuses the light incident on the polarization micro lens array.

According to an aspect of the present disclosure, when light having another-axis polarization direction is incident, the polarization micro lens array transmits the light incident on the polarization micro lens array as is.

According to an aspect of the present disclosure, a light-field camera includes: the optical system; an image sensor configured to sense light having passed through the optical system; and a control unit configured to control the optical system to acquire two-dimensional information and three-dimensional spatial information from an object.

As described above, an aspect of the present disclosure has advantages in that two-dimensional information and three-dimensional spatial information having the same depth can be simultaneously acquired using one camera.

DETAILED DESCRIPTION

Figure 1:
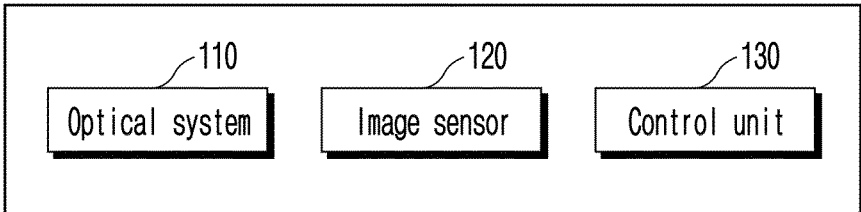
FIG. 1 is a diagram illustrating a configuration of a lightfield camera according to an embodiment of the present disclosure.

Hereinafter, embodiments of the present disclosure will be described in detail with reference to the accompanying drawings so that the present disclosure can be easily carried out by those skilled in the art to which the present disclosure pertains. However, the present disclosure can be implemented in various different forms and is not limited to the embodiments described below. In the drawings, parts irrelevant to the description are omitted in order to clearly describe the present disclosure, and similar reference numerals are given to similar parts throughout the specification.

Throughout the specification, when a certain part is referred to as being "connected" to another part, it includes not only a case where the part is "directly connected" to the another part but also a case where the part is "electrically connected" to the another part with another component interposed therebetween. Furthermore, when a certain part is referred to as "including" a certain component, it means that the part may not exclude other components but further include other components, unless otherwise stated, and it should be understood that it does not exclude the possibility of existence or addition of one or more other characteristics, numbers, steps, operations, components, parts, or combinations of them in advance.

The following embodiments are detailed descriptions for helping the understanding of the present disclosure and do not limit the scope of the rights of the present disclosure. Accordingly, inventions of the same scope that perform the same function as the present disclosure also fall within the scope of the rights of the present disclosure.

Furthermore, each construction, process, procedure, or method included in each embodiment of the present disclosure may be shared within a range in which the constructions, processes, procedures, or methods do not contradict each other technically.

FIG. 1 is a diagram illustrating a configuration of a lightfield camera according to an embodiment of the present disclosure.

Referring to FIG. 1, a lightfield camera 100 according to an embodiment of the present disclosure includes an optical system 110, an image sensor 120, and a control unit 130.

The lightfield camera 100 acquires two-dimensional information or three-dimensional spatial information of an object in real time and provides the acquired information to a photographer. The photographer may confirm both the two-dimensional information and the three-dimensional spatial information of the object even without a separate device for acquiring three-dimensional spatial information such as a glasses-type display device.

The optical system 110 causes object light scattered from the object to enter the image sensor 120. Object light scattered from an object may be generated by natural light, or object light scattered from an object may be generated by separate external lighting. The optical system 110 causes the object light generated from the object to enter the image sensor 120. In such a case, the optical system 110 may cause object light (two-dimensional information) having only intensity information of the object to enter the image sensor 120 in real time under the control of the control unit 130, or may cause object light (three-dimensional spatial information) having both intensity information and direction information of the object to enter the image sensor 120 in real time under the control of the control unit 130. That is, the optical system 110 causes appropriate object light to enter the image sensor 120 so that the image sensor 120 can sense two-dimensional information or three-dimensional spatial information of the object in real time under the control of the control unit 130. A specific description of the optical system 110 is described below with reference to FIGS. 3 to 9.

The image sensor 120 senses light (two-dimensional image or three-dimensional image) having passed through the optical system 110. As the two-dimensional image or the three-dimensional image is sensed by the image sensor 120, the photographer may confirm both the two-dimensional information and the three-dimensional spatial information of the object by using the lightfield camera 100.

The control unit 130 controls the optical system 110 to acquire the two-dimensional information or the three-dimensional spatial information from the object. The control unit 130 may be a processor such as a central processing unit, a microprocessor, a multiprocessor, an integrated circuit, or equivalent thereof. As described below, the control unit 130 may allow the image sensor 120 to sense the two-dimensional image or the three-dimensional image by controlling a polarization switching layer 220 to be described below with reference to FIGS. 2A and 2B, a polarization-dependent concave lens 240 to be described below with reference to FIGS. 2A and 2B, and a polarization micro lens array 250 to be described below with reference to FIGS. 2A and 2B within the optical system 110. Accordingly, the photographer may confirm both the two-dimensional information and the three-dimensional spatial information of the object in real time by using the image sensor 120.

Figure 2A:
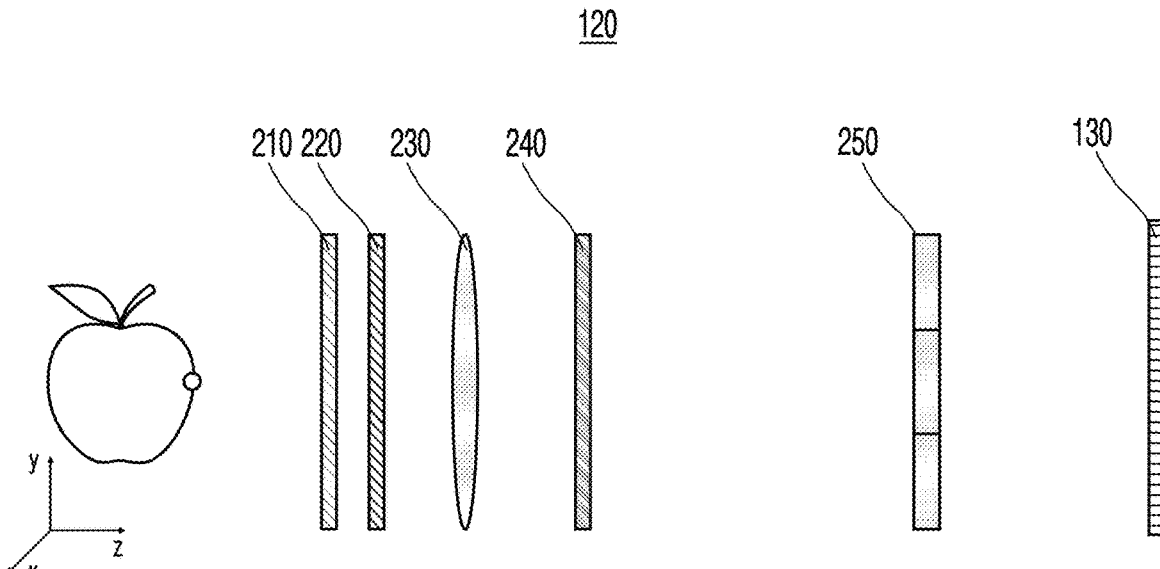
FIGS. 2A and 2B are diagrams illustrating a configuration of an optical system according to first and second embodiments of the present disclosure.

FIG. 2A is a diagram illustrating a configuration of an optical system according to a first embodiment of the present disclosure.

Referring to FIG. 2A, an optical system 110 according to the first embodiment of the present disclosure includes a polarizer 210, the polarization switching layer 220, a main lens 230, the polarization-dependent concave lens 240, and the polarization micro lens array 250.

The polarizer 210 adjusts the polarization state of object light scattered from an object to one polarization direction.

The polarization switching layer 220 is disposed at the rear end of the polarizer 210 based on the direction of travel of the object light, and adjusts the polarization state of the object light having passed through the polarizer 210 under the control of the control unit 130. The polarization switching layer 220 has a structure illustrated in FIGS. 3A and 3B.

Figure 3A:
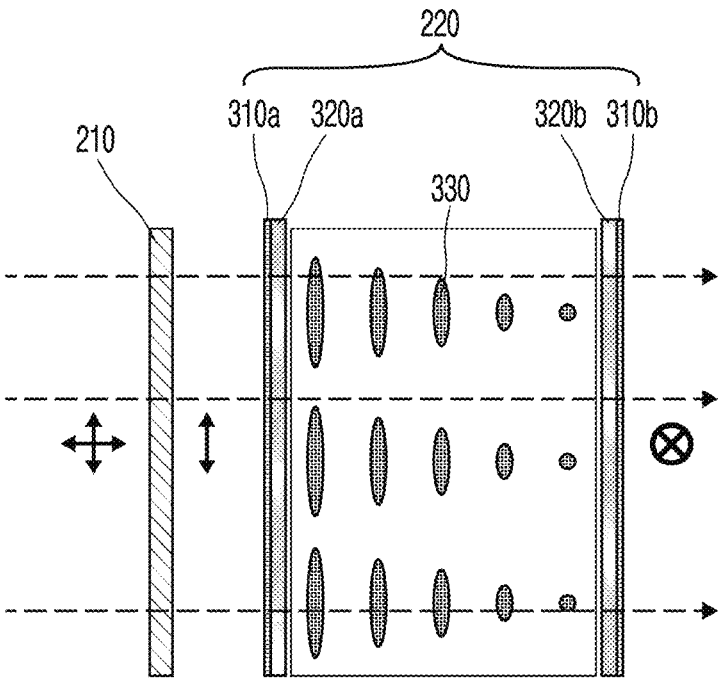
FIGS. 3A and 3B are diagrams illustrating a structure and an operation example of a polarization switching layer according to an embodiment of the present disclosure.
Figure 3B:
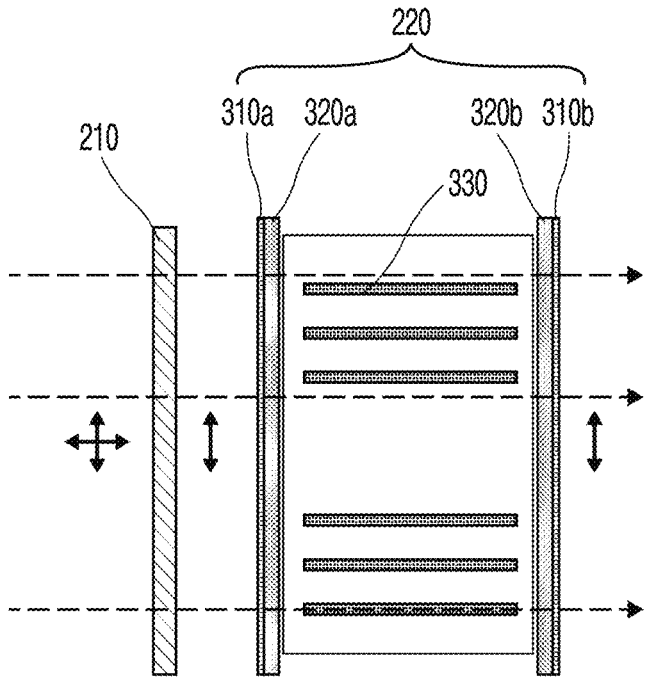

FIGS. 3A and 3B are diagrams illustrating a structure and an operation example of the polarization switching layer according to an embodiment of the present disclosure.

Referring to FIGS. 3A and 3B, the polarization switching layer 220 according to an embodiment of the present disclosure includes transparent electrodes 310a and 310b, liquid crystal alignment films 320a and 320b, and a liquid crystal layer 330.

The transparent electrodes 310a and 310b apply voltage to both ends of the liquid crystal layer 330 in order to adjust the refractive index of the liquid crystal layer 330. The transparent electrodes 310a and 310b are disposed at both ends (far from the liquid crystal layer 330) of the liquid crystal alignment films 320a and 320b, and apply voltage to the liquid crystal layer 330.

The liquid crystal alignment films 320a and 320b allow the liquid crystal layer 330 to be disposed at both ends facing each other, and align liquid crystal materials in the liquid crystal layer 330 in specific direction and position.

The alignment direction of the liquid crystal layer 330 is changed depending on the voltage applied by the transparent electrodes 310a and 310b, and the liquid crystal layer 330 changes the polarization direction of light transmitting therethrough. For example, the liquid crystal layer 330 may change the polarization direction of light transmitting therethrough to one-axis direction (for example, the x-axis direction of FIGS. 2A and 2B) or to another-axis direction (for example, the y-axis direction of FIGS. 2A and 2B) perpendicular to one axis according to the voltage applied by the transparent electrodes 310a and 310b. For example, when no voltage is applied to the liquid crystal layer 330, the liquid crystal layer 330 may transmit light having another-axis direction (illustrated in FIG. 3B), and when a voltage is applied to the liquid crystal layer 330, the liquid crystal layer 330 may transmit light having one-axis direction (illustrated in FIG. 3A). Alternatively, the reverse may also be true.

In this way, the polarization switching layer 220 adjusts the polarization direction of light passing therethrough to one axis perpendicular to the direction of travel of the light or another-axis polarization direction under the control of the control unit 130.

Referring back to FIG. 2A, the main lens 230 receives the light passing through the polarization switching layer 220 and focuses the light to one focal point. In some cases, the main lens 230 may focus light (based on the direction of travel of the light) to the front end of the polarization micro lens array 250 or to the image sensor 120.

The polarization-dependent concave lens 240 is disposed at the rear end of the main lens 230 based on the direction of travel of the object light, and transmits or disperses the light depending on the polarization direction of the light incident on the polarization-dependent concave lens 240. The polarization-dependent concave lens 240 has a structure as illustrated in FIGS. 4A, 4B, and 4C.

Figure 4A:
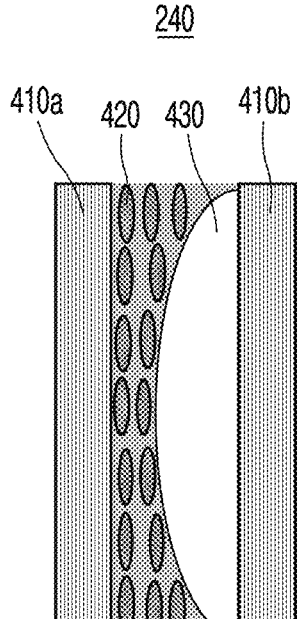
FIGS. 4A, 4B and 4C are diagrams illustrating a structure and an operation example of a polarization-dependent concave lens according to an embodiment of the present disclosure.
Figure 4B:
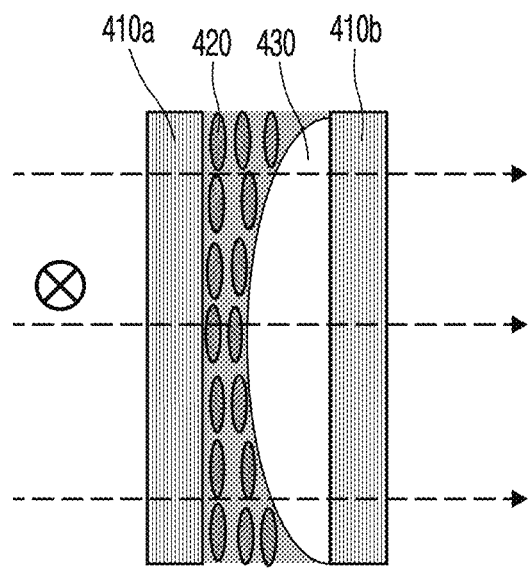
Figure 4C:
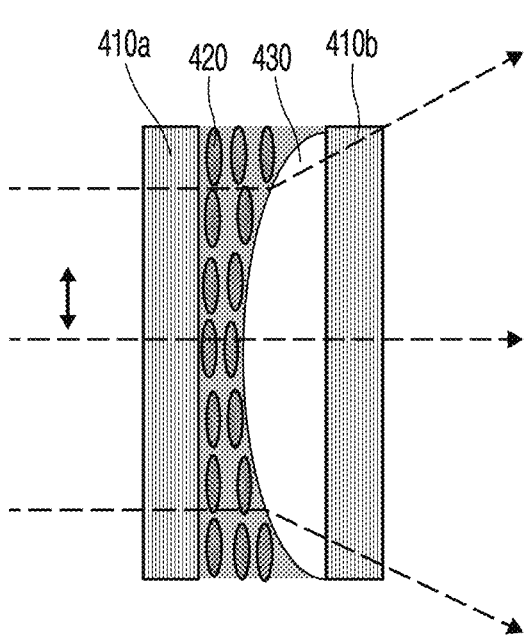

FIGS. 4A, 4B, and 4C are diagrams illustrating a structure and an operation example of the polarization-dependent concave lens according to an embodiment of the present disclosure.

Referring to FIGS. 4A, 4B, and 4C, the polarization-dependent concave lens 240 according to an embodiment of the present disclosure includes film substrates 410a and 410b, a reactive liquid crystal layer 420, and an isotropic polymer material 430.

The film substrates 410a and 410b are implemented with a material that transmits light or is transparent, and provide spaces where the components 420 and 430 are grown or disposed.

The reactive liquid crystal layer 420 has the same refractive index as the isotropic polymer material 430 for one-axis polarization direction, but has a greater refractive index than the isotropic polymer material 450 for another-axis polarization direction.

The isotropic polymer material 430 is disposed behind the liquid crystal polymer material 420 in the direction in which light is incident on the polarization-dependent concave lens

240. The isotropic polymer material 430 is implemented in a convex shape in the direction in which light is initially incident, while contacting the liquid crystal polymer material 420 in all areas.

On the other hand, the isotropic polymer material 430 has the same refractive index as that for the one-axis polarization direction of the reactive liquid crystal layer 420.

Since the polarization-dependent concave lens 240 includes such a configuration, it operates as illustrated in FIG. 4B or FIG. 4C depending on the polarization direction of incident light.

When light having one-axis polarization direction is incident on the polarization-dependent concave lens 240, the refractive indices of the two materials 420 and 430 become equal to each other. As illustrated in FIG. 4B, the polarization-dependent concave lens 240 transmits the incident light as is without changing an optical path.

On the other hand, when light having another-axis polarization direction is incident on the polarization-dependent concave lens 240, the refractive index of the reactive liquid crystal layer 420 is greater than the refractive index of the isotropic polymer material 430. Due to the difference in refractive indices between the two materials 420 and 430 and the shape of the isotropic polymer material 430, the polarization-dependent concave lens 240 disperses the light incident thereon as illustrated in FIG. 4C, and operates like a concave lens. When operating like a concave lens, the polarization-dependent concave lens 240 operates as a concave lens having a preset refractive power. The preset refractive power means a refractive power that allows the light incident on the polarization-dependent concave lens 240 to be focused onto the image sensor 120 via the polarization micro lens array 250. As the polarization-dependent concave lens 240 has the preset refractive power, the polarization-dependent concave lens 240 focuses light having another-axis polarization direction (incident on the polarization-dependent concave lens 240) to the image sensor 120.

Referring back to FIG. 2A, the polarization micro lens array 250 is disposed at the rear end of the polarization-dependent concave lens 240 based on the direction of travel of the object light, and transmits or focuses the light depending on the polarization direction of the light incident on the polarization-dependent concave lens 240. The polarization micro lens array 250 operates as illustrated in FIGS. 5A and 5B.

Figure 5A:
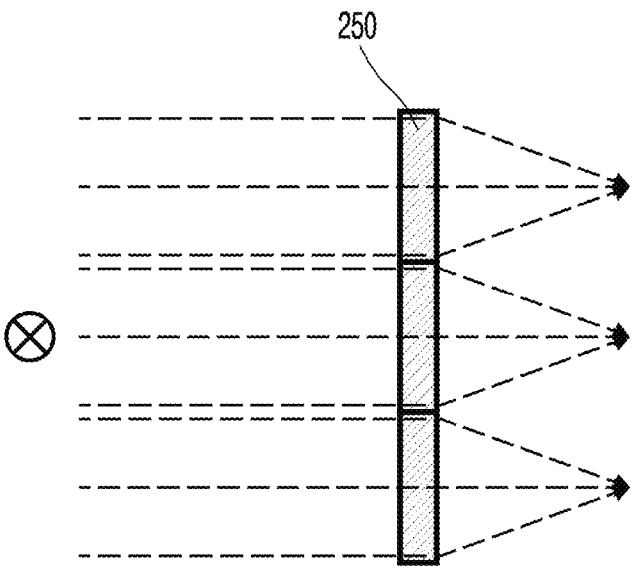
FIGS. 5A and 5B are diagrams illustrating an operation example of a polarization micro lens array according to an embodiment of the present disclosure.
Figure 5B:
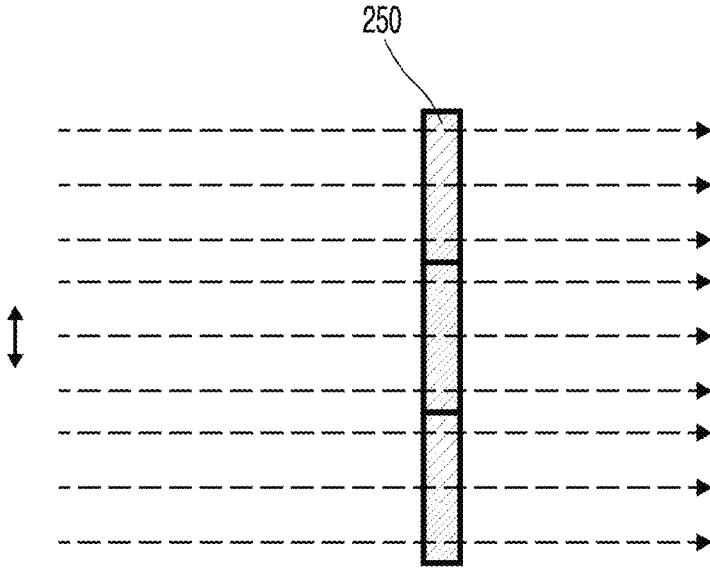

FIGS. 5A and 5B are diagrams illustrating an operation example of the polarization micro lens array according to an embodiment of the present disclosure.

The polarization micro lens array 250 is implemented to have a structure similar to that of the polarization-dependent concave lens 240. However, unlike the polarization-dependent concave lens 240, since the polarization micro lens array 250 transmits or focuses light, it is implemented differently from the isotropic polymer material 430 only in shape or arrangement. As a representative example, in the structure of the polarization-dependent concave lens 240 illustrated in FIG. 4A, when the isotropic polymer material 430 is positioned in close contact with the film substrate 410a, the polarization-dependent concave lens 240 may operate like the polarization micro lens array 250.

As illustrated in FIG. 5A, when light having one-axis polarization direction is incident on the polarization micro lens array 250, the polarization micro lens array 250 focuses the light incident thereon.

On the other hand, as illustrated in FIG. 5B, when light having another-axis polarization direction is incident on the polarization micro lens array 250, the polarization micro lens array 250 transmits the light incident thereon as is.

When the polarization micro lens array 250 transmits the light as is, the image sensor 120 may sense the light having passed through the polarization micro lens array 250 and analyze the two-dimensional information of the object. On the other hand, when the polarization micro lens array 250 focuses the light incident thereon, the image sensor 120 may sense the light having passed through the polarization micro lens array 250 and analyze the three-dimensional information of the object.

Since the optical system 110 according to the first embodiment of the present disclosure includes the above-mentioned configurations, the optical system 110 operates as follows according to the operation of the polarization switching layer 220.

Figure 6:
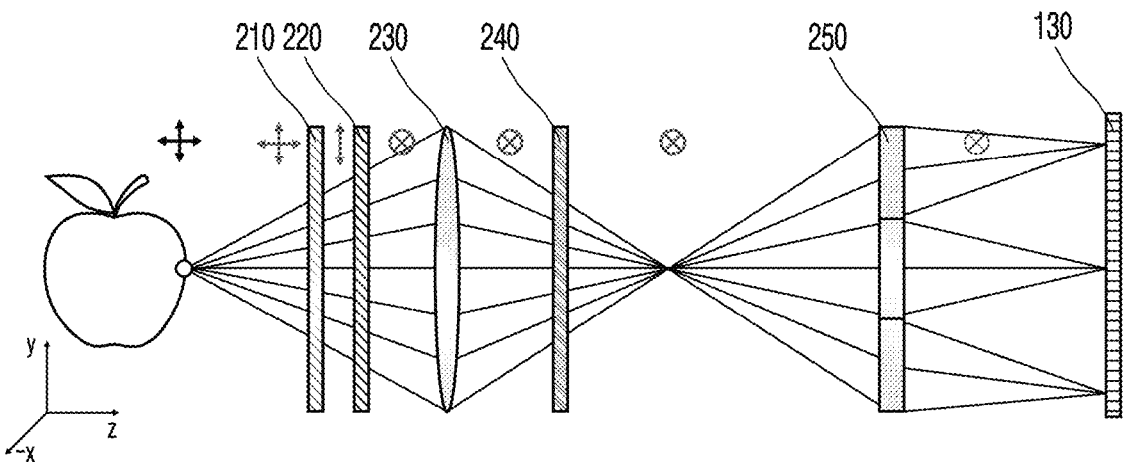
FIGS. 6 and 7 are diagrams illustrating an operation example of an optical system according to an embodiment of the present disclosure.
Figure 7:
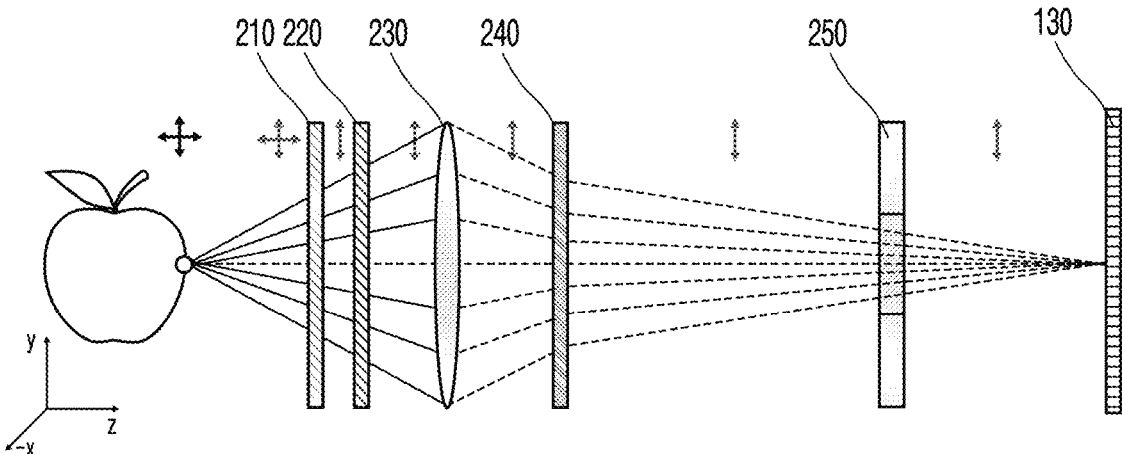

FIGS. 6 and 7 are diagrams illustrating an operation example of the lightfield camera according to an embodiment of the present disclosure.

Referring to FIG. 6, unpolarized object light is incident on the polarizer 210. The polarizer 210 converts the unpolarized object light into light having one polarization direction. The following description is given on the assumption that the one polarization direction is another-axis polarization direction.

The light having another-axis polarization direction converted by the polarizer 210 is incident on the polarization switching layer 220. In such a case, when the polarization switching layer 220 is not operating (no voltage is applied to the liquid crystal layer 330), the light incident on the polarization switching layer 220 is converted to light having one-axis polarization direction while passing through the polarization switching layer 220.

The light having passed through the polarization switching layer 220 is refracted while passing through the main lens 230 and is focused.

The light having passed through the main lens 230 is incident on the polarization-dependent concave lens 240. In such a case, since the incident light has one-axis polarization direction, the polarization-dependent concave lens 240 transmits the incident light as is.

The light transmitted through the polarization-dependent concave lens 240 is first focused at the front end of the polarization micro lens array 250, is dispersed again, and then is incident on the polarization micro lens array 250. Since the light having one-axis polarization direction is incident on the polarization micro lens array 250, the polarization micro lens array 250 focuses the light incident thereon. Accordingly, the lightfield camera 100 may acquire the three-dimensional spatial information of the object while operating like a lightfield camera in the related art.

Referring to FIG. 7, the polarization switching layer 220 may operate under the control of the control unit 130. When the polarization switching layer 220 operates (voltage is applied to the liquid crystal layer 330), light incident on the polarization switching layer 220 proceeds as is without a change in a polarization direction.

The light having passed through the polarization switching layer 220 is refracted and focused while passing through the main lens 230.

The light having passed through the main lens 230 is incident on the polarization-dependent concave lens 240. In such a case, since the incident light has another-axis polarization direction, the polarization-dependent concave lens 240 disperses the incident light while operating like a concave lens.

The light dispersed by the polarization-dependent concave lens 240 is incident on the polarization micro lens array 250. Since the light having another-axis polarization direction is incident on the polarization micro lens array 250, the polarization micro lens array 250 transmits the light incident on thereon as is.

In such a case, since the polarization-dependent concave lens 240 has a preset refractive power when operating like a concave lens, the light having passed through the main lens 230 and the polarization-dependent concave lens 240 is focused onto the image sensor 120. In this way, since the light (having passed through the main lens 230 and the polarization-dependent concave lens 240) is transmitted through the polarization micro lens array 250 as is and is focused onto the image sensor 120, the lightfield camera 100 may acquire the two-dimensional information on the object while operating like a two-dimensional camera in the related art.

In the above, it has been described when light having one-axis polarization direction is incident, the polarization-dependent concave lens 240 transmits the light and the polarization micro lens array 250 focuses light and when light having another-axis polarization direction is incident, the polarization-dependent concave lens 240 disperses the light and the polarization micro lens array 250 transmits the light; however, the present disclosure is not necessarily limited thereto. The polarization micro lens array 250 focuses light when the polarization-dependent concave lens 240 transmits the light, and if the reverse is satisfied, the components 240 and 250 may operate for any polarization direction.

Also in the polarization switching layer 220, the polarization direction of light passing therethrough may be different from the above-mentioned polarization direction depending on whether the polarization switching layer 220 is operating.

Figure 8:
FIGS. 8 and 9 are diagrams illustrating simulation results in which a lightfield camera according to an embodiment of the present disclosure acquires two-dimensional information and three-dimensional spatial information of an object.
Figure 9:
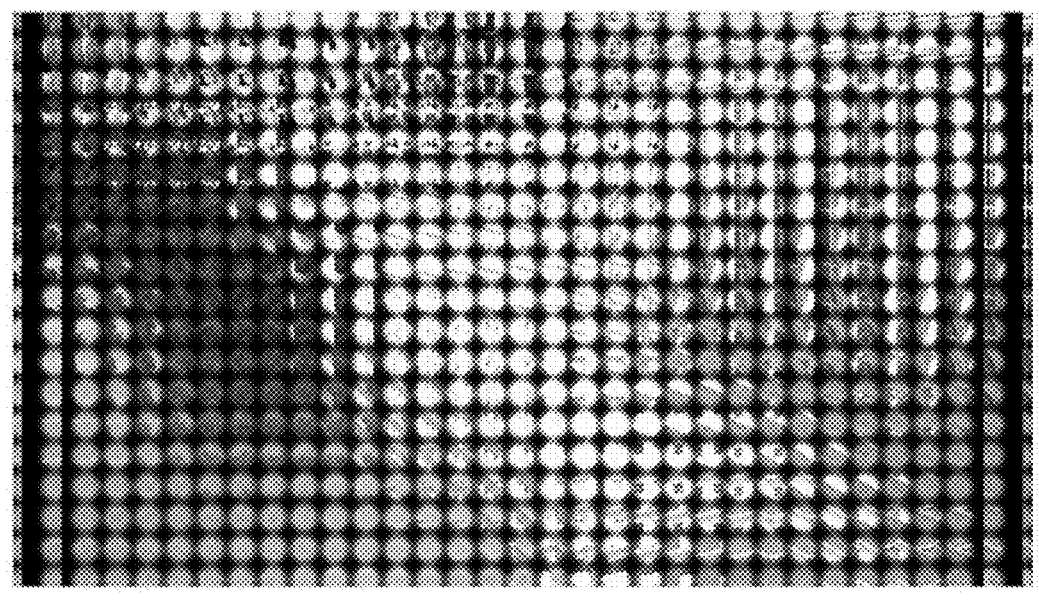
Figure 10A:
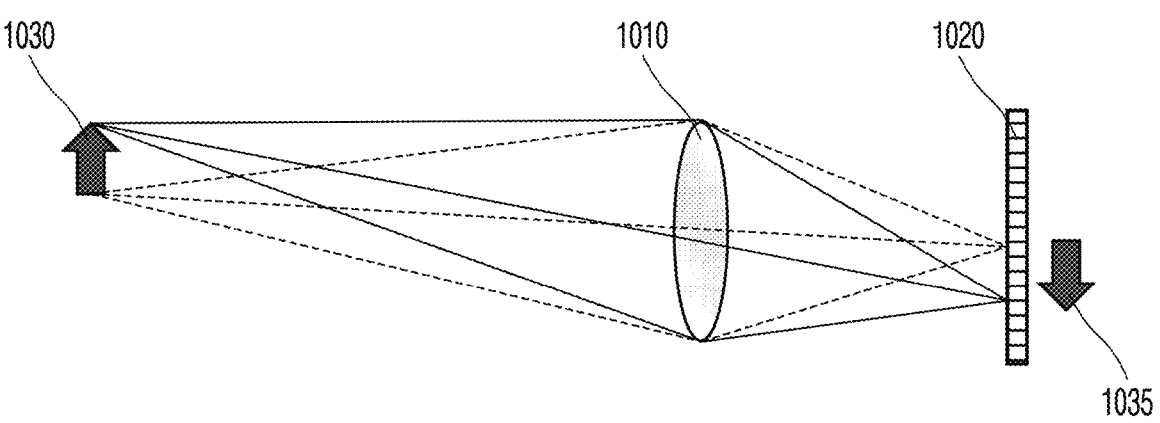
FIGS. 10A and 10B are diagrams illustrating the operation and shooting results of a general camera that acquires two-dimensional information.
Figure 10B:
Figure 11A:
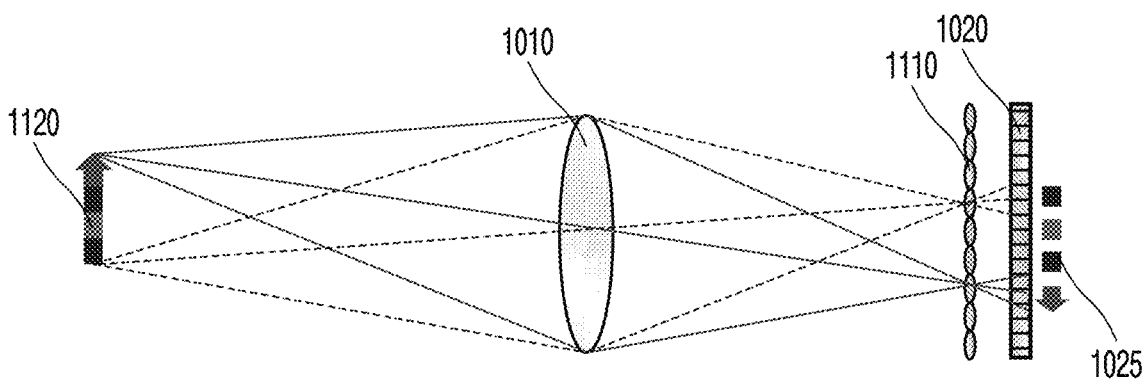
FIGS. 11A and 11B are diagrams illustrating the operation and shooting results of a general camera that acquires three-dimensional spatial information.
Figure 11B:
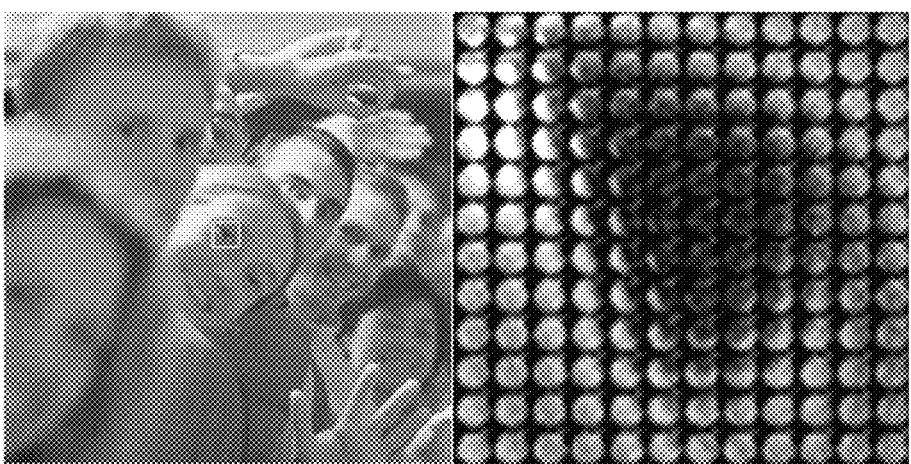

By including the above-mentioned configurations, the lightfield camera 100 can acquire two-dimensional information and three-dimensional spatial information as illustrated in FIGS. 8 and 9.

FIGS. 8 and 9 are diagrams illustrating simulation results in which the lightfield camera according to an embodiment of the present disclosure acquires two-dimensional information and three-dimensional spatial information of an object.

As illustrated in FIG. 8, the lightfield camera 100 may acquire two-dimensional information (image) that is precisely focused.

As illustrated in FIG. 9, the lightfield camera 100 may acquire three-dimensional spatial information (image) that is precisely focused.

Figure 2B:
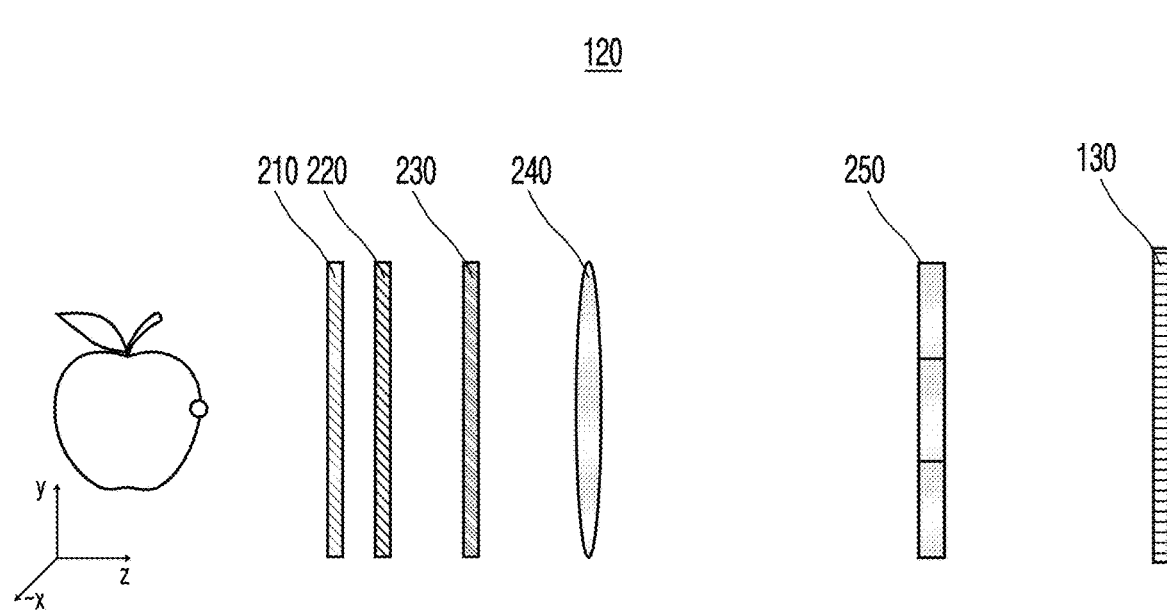

FIG. 2B is a diagram illustrating the configuration of an optical system according to a second embodiment of the present disclosure.

Referring to FIG. 2B, the optical system 110 according to the second embodiment of the present disclosure includes the same configuration as the optical system 110 according to the first embodiment of the present disclosure. However, the polarization-dependent concave lens 240 is disposed at the front end, not the rear end, of the main lens 230 on the path of the object light, and may perform the above-mentioned operation at the front end of the main lens 230.

The polarization-dependent concave lens 240 according to the second embodiment of the present disclosure may operate like a concave lens having a preset refractive power, and the preset refractive power means a refractive power that allows light incident on the polarization-dependent concave lens 240 to be focused onto the image sensor 120 via the main lens 230 and the polarization micro lens array 250. Accordingly, in the same situation, a two-dimensional image can be focused onto the image sensor 120, and the image sensor 120 may acquire two-dimensional information.

The above description is merely a description of the technical spirit of the present embodiment, and those skilled in the art may change and modify the present embodiment in various ways without departing from the essential characteristic of the present embodiment. Accordingly, the embodiments should not be construed as limiting the technical spirit of the present embodiment, but should be construed as describing the technical spirit of the present embodiment. The scope of the technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

This patent is the result of research conducted with the support of Agency for Defense Development with funds from the Government of the Republic of Korea (multi-department) in 2023 (Detailed Project Number: 22-CM-BD-03, Project Name: Development of 2D/3D Spatial Information Simultaneous Acquisition Technology Based on Variable High-Speed Switching Micro Lens Array for Unmanned Vehicle).

What is claimed is:

1. An optical system comprising:
   a polarizer configured to adjust a polarization state of object light scattered from an object to one polarization direction;
   a polarization switching layer disposed at a rear end of the polarizer based on a direction of travel of the object light, and configured to adjust a polarization state of the object light having passed through the polarizer;
   a main lens configured to receive the light having passed through the polarization switching layer and focus the light to one focal point;
   a polarization-dependent concave lens disposed at a rear end of the main lens based on the direction of travel of the object light, and configured to transmit or disperse light incident on the polarization-dependent concave lens depending on a polarization direction of the light; and
   a polarization micro lens array disposed at a rear end of the polarization-dependent concave lens based on the direction of travel of the object light, and configured to focus or transmit light incident on the polarization micro lens array depending on a polarization direction of the light.

2. The optical system of claim 1, wherein, when light having one-axis polarization direction is incident, the polarization-dependent concave lens transmits the incident light as is without changing a path.

3. The optical system of claim 2, wherein, when light having another-axis polarization direction is incident, the polarization-dependent concave lens disperses the light incident on the polarization-dependent concave lens.

4. The optical system of claim 1, wherein, when light having one-axis polarization direction is incident, the polarization micro lens array focuses the light incident on the polarization micro lens array.

5. The optical system of claim 4, wherein, when light having another-axis polarization direction is incident, the polarization micro lens array transmits the light incident on the polarization micro lens array as is.

6. The optical system of claim 1, wherein the polarization switching layer adjusts a polarization direction of the light passing therethrough to one axis perpendicular to a direction of travel of the light or another-axis polarization direction.

7. A lightfield camera comprising:

the optical system of claim 1;

an image sensor configured to sense light having passed through the optical system; and a control unit configured to control the optical system to acquire two-dimensional information and three-dimensional spatial information from an object.

8. An optical system comprising:

a polarizer configured to adjust a polarization state of object light scattered from an object to one polarization direction;

a polarization switching layer disposed at a rear end of the polarizer based on a direction of travel of the object light, and configured to adjust a polarization state of the object light having passed through the polarizer;

a polarization-dependent concave lens disposed at a rear end of the polarization switching layer based on the direction of travel of the object light, and configured to transmit or disperse light incident on the polarization-dependent concave lens depending on a polarization direction of the light;

a main lens configured to receive the light having passed through the polarization-dependent concave lens and focus the light to one focal point; and a polarization micro lens array disposed at a rear end of the polarization-dependent concave lens based on the direction of travel of the object light, and configured to focus or transmit light incident on the polarization micro lens array depending on a polarization direction of the light.

9. The optical system of claim 8, wherein, when light having one-axis polarization direction is incident, the polarization-dependent concave lens transmits the incident light as is without changing a path.

10. The optical system of claim 9, wherein, when light having another-axis polarization direction is incident, the polarization-dependent concave lens disperses the light incident on the polarization-dependent concave lens.

11. The optical system of claim 10, wherein, when dispersing the light incident on the polarization-dependent concave lens, the polarization-dependent concave lens has a preset refractive power and disperses the light.

12. The optical system of claim 8, wherein, when light having one-axis polarization direction is incident, the polarization micro lens array focuses the light incident on the polarization micro lens array.

13. The optical system of claim 12, wherein, when light having another-axis polarization direction is incident, the polarization micro lens array transmits the light incident on the polarization micro lens array as is.

* * * * *